United States Patent
Sassi et al.

(10) Patent No.: US 11,584,238 B2
(45) Date of Patent: Feb. 21, 2023

(54) PASSIVE STRUCTURAL STOPPER BRACKET

(71) Applicant: Ford Global Technologies, LLC, Dearborn, MI (US)

(72) Inventors: Abdelmonaam Sassi, Windsor (CA); Heiko Landsmann, Cologne (DE); Shekar Prabhakar Erasala, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 32 days.

(21) Appl. No.: 17/027,827

(22) Filed: Sep. 22, 2020

(65) Prior Publication Data
US 2022/0089039 A1    Mar. 24, 2022

(51) Int. Cl.
*B60L 50/60* (2019.01)
*B62D 21/15* (2006.01)
*B60K 1/04* (2019.01)

(52) U.S. Cl.
CPC ........... *B60L 50/66* (2019.02); *B60K 1/04* (2013.01); *B62D 21/15* (2013.01); *B60K 2001/0438* (2013.01)

(58) Field of Classification Search
CPC .... B60K 2001/0438; B60K 2001/0433; B60K 2001/0422; B62D 21/15; B62D 21/157; B60L 50/64; B60L 50/66
See application file for complete search history.

(56) References Cited

U.S. PATENT DOCUMENTS

| | | | | |
|---|---|---|---|---|
| 8,708,402 | B2 * | 4/2014 | Saeki | B62D 21/157 |
| | | | | 180/68.5 |
| 9,493,190 | B1 * | 11/2016 | Alwan | B62D 25/025 |
| 10,065,491 | B1 * | 9/2018 | Syed | B60L 50/64 |
| 10,293,860 | B1 * | 5/2019 | Cooper | B62D 25/025 |
| 10,494,030 | B1 * | 12/2019 | Paramasivam | B60K 1/04 |
| 11,110,968 | B2 * | 9/2021 | Ahn | B60K 1/04 |
| 2013/0026786 | A1 * | 1/2013 | Saeki | B60K 1/04 |
| | | | | 296/187.08 |
| 2016/0114699 | A1 * | 4/2016 | Hokazono | B60K 1/04 |
| | | | | 180/68.5 |
| 2016/0236713 | A1 * | 8/2016 | Sakaguchi | B62D 25/2036 |
| 2016/0257346 | A1 * | 9/2016 | Wu | B60K 1/04 |
| 2016/0288636 | A1 * | 10/2016 | Kamimura | B62D 25/2036 |

(Continued)

FOREIGN PATENT DOCUMENTS

| | | |
|---|---|---|
| CN | 210122060 U | 3/2020 |
| DE | 102010045997 A1 | 11/2011 |
| KR | 101488425 B1 | 2/2015 |

*Primary Examiner* — Jeffrey J Restifo
(74) *Attorney, Agent, or Firm* — Vichit Chea; Carlson, Gaskey & Olds, P.C.

(57) ABSTRACT

A method and an apparatus, according to an exemplary aspect of the present disclosure includes, among other things, a battery pack supported by at least one vehicle frame member, a side frame member positioned adjacent to an edge of the battery pack, and a cross-member extending away from the side frame member and above the battery pack. The cross-member is spaced from the battery pack by a gap. At least one bracket is mounted to at least one of the side frame member and cross-member within the gap such that in response to an impact load, the bracket prevents the cross-member from direct contact with the battery pack.

23 Claims, 3 Drawing Sheets

(56) References Cited

U.S. PATENT DOCUMENTS

| | | | |
|---|---|---|---|
| 2016/0311301 A1* | 10/2016 | Ikeda | B62D 29/001 |
| 2016/0375750 A1* | 12/2016 | Hokazono | B62D 25/2036 180/68.5 |
| 2017/0355255 A1* | 12/2017 | Brausse | B62D 21/157 |
| 2018/0208038 A1* | 7/2018 | Ozawa | B62D 25/2036 |
| 2018/0229594 A1* | 8/2018 | Rottelberger | B60R 13/04 |
| 2018/0236863 A1* | 8/2018 | Kawabe | B60K 1/04 |
| 2018/0273100 A1* | 9/2018 | Kim | B62D 21/157 |
| 2018/0361875 A1* | 12/2018 | Ruech | B23K 31/02 |
| 2018/0370570 A1* | 12/2018 | Ayukawa | B62D 25/2018 |
| 2019/0009662 A1* | 1/2019 | Toyota | B60L 50/64 |
| 2019/0023323 A1* | 1/2019 | Uehata | B62D 25/025 |
| 2019/0031241 A1* | 1/2019 | Ayukawa | B60L 50/66 |
| 2019/0081298 A1* | 3/2019 | Matecki | B60R 19/023 |
| 2019/0100090 A1* | 4/2019 | Matecki | B60K 1/04 |
| 2019/0185071 A1* | 6/2019 | Choi | B62D 29/002 |
| 2019/0382051 A1* | 12/2019 | Toyota | B62D 25/2036 |
| 2020/0023905 A1* | 1/2020 | Kawase | B62D 25/025 |
| 2020/0101915 A1* | 4/2020 | Kim | B62D 21/157 |
| 2020/0114970 A1* | 4/2020 | Nusier | B62D 21/157 |
| 2020/0215895 A1* | 7/2020 | Tanaka | B60K 1/04 |
| 2021/0146763 A1* | 5/2021 | Shin | B60L 50/64 |
| 2021/0175572 A1* | 6/2021 | He | B60L 50/64 |
| 2021/0309090 A1* | 10/2021 | Övgård | H01M 50/249 |
| 2022/0041219 A1* | 2/2022 | Son | B62D 29/002 |
| 2022/0069405 A1* | 3/2022 | Choi | H01M 50/249 |
| 2022/0080820 A1* | 3/2022 | Takahashi | B60K 1/04 |
| 2022/0089039 A1* | 3/2022 | Sassi | B62D 21/15 |
| 2022/0111910 A1* | 4/2022 | Hirota | B60K 1/04 |
| 2022/0118838 A1* | 4/2022 | Jung | H01M 50/258 |
| 2022/0134857 A1* | 5/2022 | Baccouche | B62D 21/02 180/68.5 |
| 2022/0134858 A1* | 5/2022 | Ozawa | B60K 1/04 180/68.5 |
| 2022/0144065 A1* | 5/2022 | Tatsuwaki | B60L 50/66 |
| 2022/0144175 A1* | 5/2022 | Sawatzki | B60L 50/66 |
| 2022/0161669 A1* | 5/2022 | Ragot | B60L 50/66 |

* cited by examiner

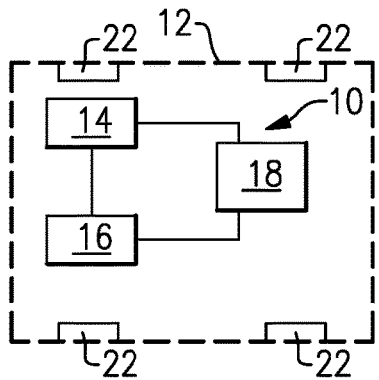
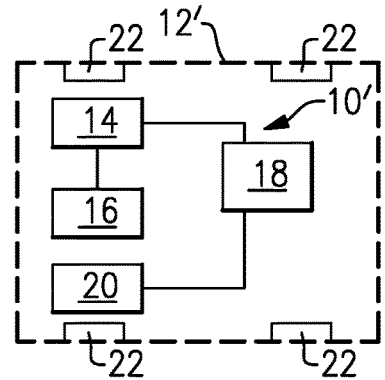
FIG.1A  FIG.1B
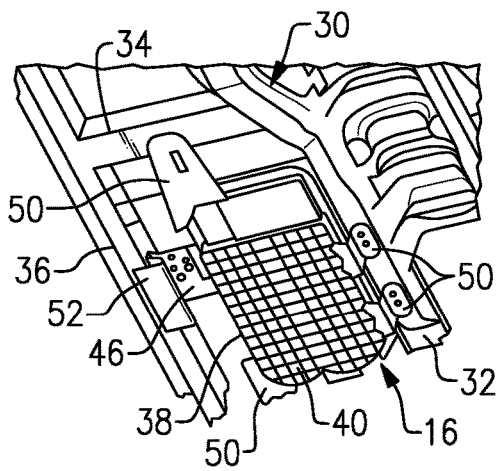
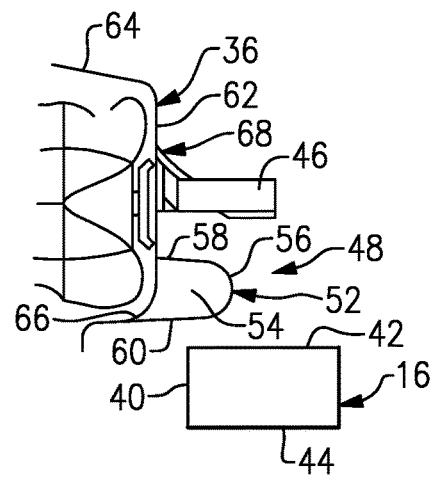
FIG.2  FIG.3
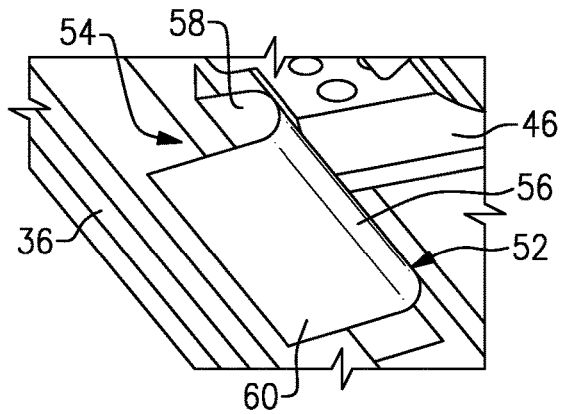
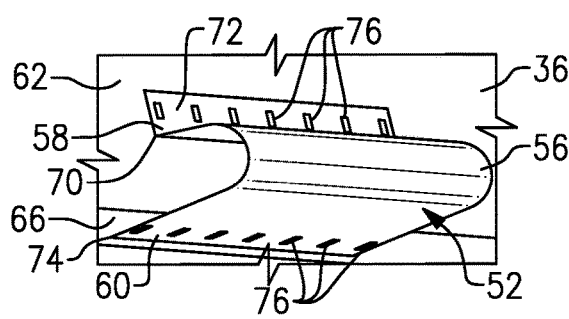
FIG.4  FIG.5

PASSIVE STRUCTURAL STOPPER BRACKET

TECHNICAL FIELD

This disclosure relates generally to a bracket that prevents a seat cross member from contacting a battery cover during an impact load event.

BACKGROUND

Electrified vehicles include a battery pack that is packaged underneath the vehicle. The battery pack is mounted on a vehicle frame and can be positioned underneath a seat supported on a cross-member. There is an ongoing effort to protect battery packs by preventing contact with frame members and cross-members during impact load events.

SUMMARY

An apparatus according to an exemplary aspect of the present disclosure includes, among other things, a battery pack supported by at least one vehicle frame member, a side frame member positioned adjacent to an edge of the battery pack, and a cross-member extending away from the side frame member and above the battery pack. The cross-member is spaced from the battery pack by a gap. At least one bracket is mounted to at least one of the side frame member and cross-member within the gap such that in response to an impact load, the bracket prevents the cross-member from direct contact with the battery pack.

In a further non-limiting embodiment of the foregoing apparatus, the side frame member comprises a rocker.

In a further non-limiting embodiment of any of the foregoing apparatus, the cross-member comprises a seat cross-member.

In a further non-limiting embodiment of any of the foregoing apparatus, the bracket is only mounted to the side frame member.

In a further non-limiting embodiment of any of the foregoing apparatus, the bracket is mounted to the cross-member.

In a further non-limiting embodiment of any of the foregoing apparatus, the bracket has an elliptical cross section, triangular cross-section, polygonal cross-section, or curved cross-section.

In a further non-limiting embodiment of any of the foregoing apparatus, the bracket has a base portion that connects an upper leg to a lower leg, wherein the upper and lower legs are spaced apart from each other.

In a further non-limiting embodiment of any of the foregoing apparatus, the upper leg is directly connected to an upper portion of the side frame member and the lower leg is directly connected to a lower portion of the side frame member, and wherein the base portion is free from contact with any structure when installed.

In a further non-limiting embodiment of any of the foregoing apparatus, the battery pack is enclosed within a cover and, in response to the impact load, the bracket plastically deforms and absorbs energy to prevent the cross-member from direct contact with the cover.

An apparatus, according to yet another exemplary aspect of the present disclosure includes, among other things, a battery pack supported by at least one vehicle frame member and enclosed within a cover, a rocker positioned adjacent to an edge of the battery pack, and a seat cross-member extending away from the rocker and above the battery pack. The seat cross-member is spaced from the cover by a gap. A stopper bracket is mounted to at least one of the rocker and the seat cross-member and extends into the gap such that in response to an impact load, the stopper bracket prevents the seat cross-member from direct contact with the cover.

In a further non-limiting embodiment of any of the foregoing apparatus, the stopper bracket is only mounted to the rocker.

In a further non-limiting embodiment of any of the foregoing apparatus, the stopper bracket has an elliptical cross section, triangular cross-section, polygonal cross-section, or curved cross-section.

In a further non-limiting embodiment of any of the foregoing apparatus, the stopper bracket has a base portion that connects an upper leg to a lower leg, wherein the upper and lower legs are spaced apart from each other by an open internal area, or wherein the stopper bracket comprises a solid body.

In a further non-limiting embodiment of any of the foregoing apparatus, a distal end of the upper leg includes a flange that is non-parallel with a distal end of the lower leg.

In a further non-limiting embodiment of any of the foregoing apparatus, the rocker includes an inner surface facing the battery pack and a lower surface facing ground, and wherein the flange of the upper leg is directly connected to the inner surface and the distal end of the lower leg is directly connected to the lower surface.

In a further non-limiting embodiment of any of the foregoing apparatus, the base portion is free from contact with any structure when installed, and, in response to the impact load, the stopper bracket plastically deforms and absorbs energy to prevent the seat cross-member from direct contact with the cover.

In a further non-limiting embodiment of any of the foregoing apparatus, the base portion comprises a curved surface.

In a further non-limiting embodiment of any of the foregoing apparatus, the base portion comprises a straight surface.

In a further non-limiting embodiment of any of the foregoing apparatus, the stopper bracket is mounted to the rocker and the seat cross-member.

A method according to still another exemplary aspect of the present disclosure includes, among other things: supporting a battery pack with at least one vehicle frame member; positioning a rocker adjacent to an edge of the battery pack; extending a seat cross-member away from the rocker and above the battery pack, the seat cross-member spaced from the battery pack by a gap; and mounting a stopper bracket to at least one of the rocker and seat cross-member to extend into the gap such that in response to an impact load, the stopper bracket plastically deforms and prevents the seat cross-member from direct contact with the battery pack.

The embodiments, examples and alternatives of the preceding paragraphs, the claims, or the following description and drawings, including any of their various aspects or respective individual features, may be taken independently or in any combination. Features described in connection with one embodiment are applicable to all embodiments, unless such features are incompatible.

BRIEF DESCRIPTION OF THE FIGURES

The various features and advantages of the disclosed examples will become apparent to those skilled in the art from the detailed description. The figures that accompany the detailed description can be briefly described as follows:

FIG. 1A is a schematic representation of a battery electric vehicle.

FIG. 1B is a schematic representation of a hybrid electric vehicle.

FIG. 2 is a perspective view of a battery pack installed underneath a vehicle.

FIG. 3 is a side section view of a seat cross-member, rocker, stopper bracket and battery pack.

FIG. 4 is a perspective view of the stopper bracket, rocker, and seat cross-member.

FIG. 5 is a perspective view showing spot welding of the stopper bracket to the rocker.

DETAILED DESCRIPTION

Figure 6:
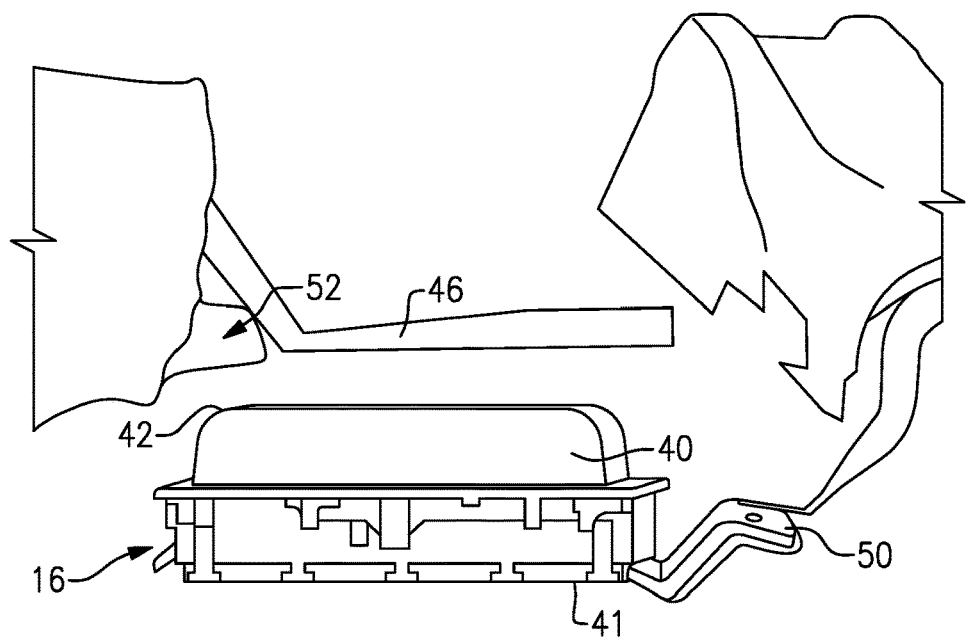
FIG. 6 is an end view showing an impact event with the stopper bracket preventing the seat cross-member from contacting the battery pack.

This disclosure details an exemplary bracket that prevents a seat cross-member from contacting a battery cover during an impact load event.

FIG. 1A schematically illustrates a powertrain 10 of an electrified vehicle 12 comprising a battery electric vehicle (BEV) while FIG. 1B schematically illustrates a powertrain 10' of an electrified vehicle 12' comprising a hybrid electric vehicle (HEV). Although FIGS. 1A-1B are depicted as a BEV and a HEV, it should be understood that the concepts described herein are not limited to BEV's and HEV's and could extend to other types of electrified vehicles, including, but not limited to, plug-in hybrid electric vehicles (PHEV's), fuel cell vehicles, etc.

In a non-limiting embodiment shown in FIG. 1A, the powertrain 10 for the BEV includes at least one electric motor/machine 14, a battery pack 16, and a control system 18 that cooperate to power the electrified vehicle 12. In a non-limiting embodiment shown in FIG. 1B, the powertrain 10' includes at least one electric motor/machine 14, a battery pack 16, a control system 18, and an engine 20 that cooperate to power the electrified vehicle 12'. It should be understood that the configurations shown in FIGS. 1A and 1B are highly schematic and that other components such as additional electric machines, generators, transmissions, gear sets, etc. in various combinations could also be included in the powertrains.

In each configuration, the battery pack 16 may be a high voltage traction battery that includes a plurality of battery arrays (i.e., battery assemblies or groupings of battery cells) capable of outputting electrical power to operate the motor 14 and/or other electrical loads of the electrified vehicle 12, 12' for providing power to propel vehicle wheels 22. The battery cells store energy for powering the various electrical loads of the electrified vehicle 12, 12'. In an embodiment, the battery cells are prismatic, lithium-ion cells. However, battery cells having other geometries (cylindrical, pouch, etc.), other chemistries (nickel-metal hydride, lead-acid, etc.), or both could alternatively be utilized within the scope of this disclosure.

The battery pack 16 is supported underneath the vehicle on a vehicle frame 30 as shown in FIG. 2. The vehicle frame 30 includes longitudinal members 32, e.g. tunnel runners, that extend along a length of the vehicle and cross-members 34 that extend across a width of the vehicle. In one example, a rocker 36 extends along one longitudinal edge 38 of the battery pack 16. The rocker 36 forms a beam/frame member that extends along a side of the vehicle between the front and rear doors.

The battery cells of the battery pack 16 are enclosed within a cover 40 that has an upper surface 42 that faces the vehicle and a lower surface 44 that faces ground (FIG. 3). A seat cross-member 46 extends away from the rocker 36 and is above the battery pack 16. The seat cross-member 46 is spaced from the upper surface 42 of the battery pack 16 by a gap 48.

A plurality of brackets 50 are used to mount the battery pack 16 to the vehicle frame 30. The subject disclosure provides a stopper bracket 52 that is mounted to the rocker 36 within the gap 48 between the seat cross-member 46 and the battery pack 16 such that in response to an impact load, the bracket 52 prevents the seat cross-member 46 from direct contact with the battery pack 16, as shown in FIG. 6. In response to an impact load, stopper bracket 52 plastically deforms and absorbs energy to prevent the seat cross-member 46 from direct contact with the battery pack 16. The stopper bracket 52 is mounted directly to the rocker 36 as shown in FIG. 4, and is positioned directly underneath the seat cross-member 46. In one example, the stopper bracket 52 is only mounted to the rocker 36 and is not mounted or connected to any other vehicle structure.

Figure 10:
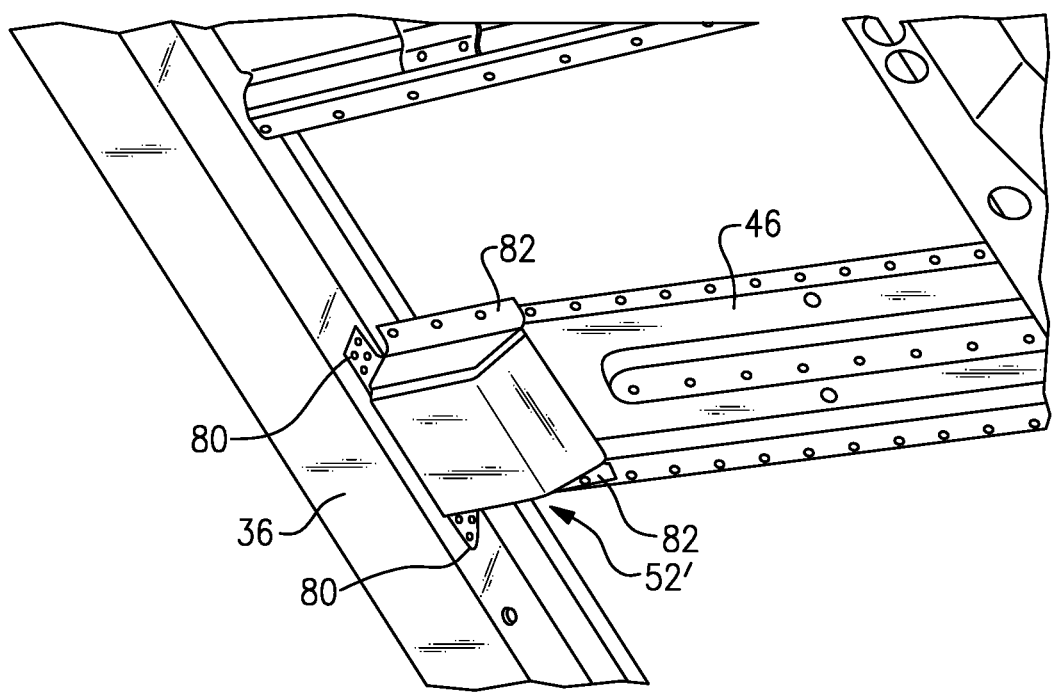
FIG. 10 is another example of a stopper bracket.

Optionally, or in addition to the stopper bracket 52 being mounted to the rocker 36, another stopper bracket 52' (FIG. 10) could be mounted to the seat cross-member 46 within the gap 48. In the example of FIG. 10, the stopper bracket 52' comprises a box-shaped bracket that has a first portion 80 that is attached to the rocker 36 and a second portion 82 that is attached to the seat cross-member 46. The box-shaped bracket has an open internal area that is enclosed by side walls and a base wall that form the box-shape. In one example, the first portion 80 comprises flanges or tabs that are positioned on opposing longitudinally spaced sides of one end of the box-shaped bracket, and the second portion 82 comprises flanges that extend in a lateral direction along opposing longitudinally spaced side edges of the box-shaped bracket. In one example, the flanges and tabs are attached to the rocker 36 and cross-member 46 with one or more spot welds; however, other attachment methods could also be used. A plurality of stopper brackets 52, 52' could be mounted to the rocker 36 and/or the seat cross-member 46 in any of various combinations as needed to prevent the rocker 36 and seat cross-member 46 from direct contact with the battery pack 16.

In one example, as shown in FIGS. 3-5, the stopper bracket 52 has an open ovoid, elliptical, or curved cross section. In other examples, the stopper bracket 52 has an open triangular cross-section (FIG. 7) or a polygonal cross-section (FIG. 8). The bracket 52 is formed such that there is an open internal area 54 that is bounded by the bracket 52 and the rocker 36. In each of the example configurations, when the vehicle experiences an impact load event, the stopper bracket 52 plastically deforms into the open internal area 54 in response to contact from the seat cross-member 46, and absorbs energy to prevent the seat cross-member 46 from direct contact with the battery pack 16.

In the example shown in FIGS. 3-5, the stopper bracket 52 has a base portion 56 that connects an upper leg 58 to a lower leg 60. The upper 58 and lower 60 legs are spaced apart from each other by the open internal area 54. In one example, the upper 58 and lower 60 legs extend generally parallel to each other and the base portion 56 comprises a curved surface that connects the legs 58, 60 together.

Figure 9:
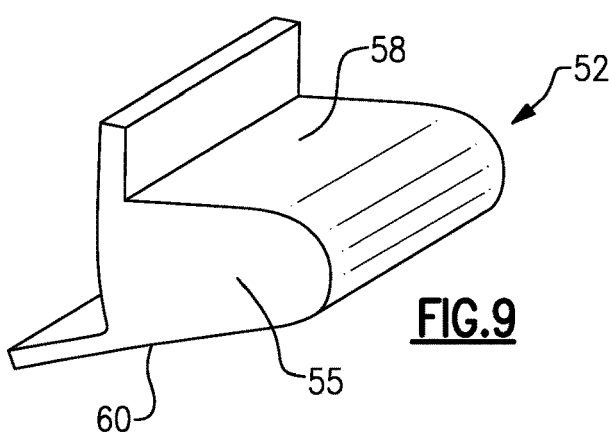
FIG. 9 is another example of a stopper bracket.

In another example shown in FIG. 9, the stopper bracket 52 comprises a solid body 55 without an open internal area. In this example, the bracket 52 can be made out of a stiff foam or hard plastic material.

In one example, the rocker 36 includes an inner facing surface 62, an upper flange 64, and a lower flange 66. The upper flange 64 extends outwardly toward an exterior of the vehicle from an upper edge of the inner facing surface 62. The lower flange 66 extends outwardly toward the exterior of the vehicle from a lower edge of the inner facing surface 62. In one example, the seat cross-member 46 is fixed to the inner facing surface 62 at a mount interface 68 as shown in FIG. 3.

In one example, a distal end 70 of the upper leg 58 includes a flange 72 (FIG. 5) that is non-parallel with a distal end 74 of the lower leg 60. In one example, the flange 72 extends upwardly away from the distal end 70 of the upper leg 58 such that the flange 72 is non-parallel with the upper and lower legs. In one example, the distal end 74 of the lower leg 60 extends further outwardly than the flange 72 of the upper leg 58. The flange 72 of the upper leg 58 is directly fixed to the inner facing surface 62 of the rocker 36. The lower leg 60 is directly fixed to a bottom surface of the lower flange 66 of the rocker 36. In one example, an inner facing surface, e.g. the surface facing the open internal area 54, of the lower leg 60 is fixed to the lower flange 66.

In one example, the flange 72 and the lower leg 60 are attached to the rocker 36 with one or more spot welds 76 as shown in FIG. 5. Other attachment methods could also be used.

In one example, the base portion 56 of the stopper bracket 52 is free from contact with any other vehicle structure when installed. In response to an impact load, the base portion 56 and the legs 58, 60 of the stopper bracket 52 plastically deform and absorb energy to prevent the seat cross-member 46 from direct contact with the cover 40 of the battery pack as shown in FIG. 6. The deformation of the base portion 56 and legs 58 results in a downward bending of the bracket 52.

Figure 7:
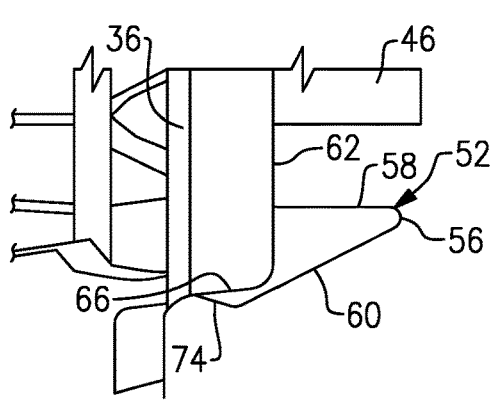
FIG. 7 is another example of a stopper bracket.
Figure 8:
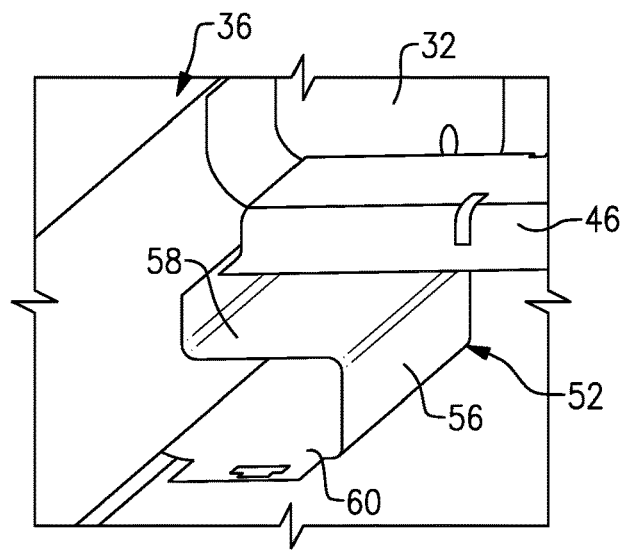
FIG. 8 is another example of a stopper bracket.

In one example, the base portion 56 comprises a curved surface (FIGS. 3 and 7). FIGS. 3-5 show the curved, ovoid, or elliptical cross-section of the stopper bracket 52. FIG. 7 shows a triangular cross-section where the lower leg 60 tapers inwardly from the distal end 74 toward the base portion 56 to form a triangular shape. In this configuration, the upper 58 and lower 60 legs are non-parallel.

In another example, the base portion 56 comprises a straight surface as shown in FIG. 8. In this configuration, the upper 58 and lower 60 legs are parallel and the base portion connects the upper 58 and lower 60 legs to form a box shape.

In one example, the bracket is made from a Boron material; however other materials could also be used. Using Boron material allows the bracket thickness to be reduced compared to other materials, which provides the benefit of reducing weight. For any material, the thickness should be sufficient to provide the desired stiffness for the bracket 52. As discussed above, for a solid bracket configuration, plastic or foam material could be used.

During operation, the vehicle may make contact with a rigid barrier, such as a pole for example. In some mounting configurations, in order to provide for more cargo capacity, the battery pack 16 may be positioned forward in a vehicle, underneath the seats and adjacent to the rocker 36. This reduces the space between the rocker and the battery pack, which brings the battery pack closer to the pole. The subject disclosure improves the vehicle frame structure in order to protect the battery pack from frame member contact due to placement of the pack underneath the seats.

During a pole impact event, the seat cross-member 46 deforms and buckles down. If the deformation of the seat cross-member 46 is not significant, the cross-member 46 remains away from the battery cover 40 and the bracket 52 is not stressed. However, if the deformation is significant, the seat cross-member 46 buckles and contacts the bracket 52 instead of contacting the battery cover 40, which provides improved protection for the battery pack 16. Thus, coupling the deformation of the cross-member 46 and the movement of the stopper bracket 52 stabilizes the battery structure and keeps the battery structure out of the impact zone.

Although a specific component relationship is illustrated in the figures of this disclosure, the illustrations are not intended to limit this disclosure. In other words, the placement and orientation of the various components shown could vary within the scope of this disclosure. In addition, the various figures accompanying this disclosure are not necessarily to scale, and some features may be exaggerated or minimized to show certain details of a particular component.

The preceding description is exemplary rather than limiting in nature. Variations and modifications to the disclosed examples may become apparent to those skilled in the art that do not necessarily depart from the essence of this disclosure. Thus, the scope of legal protection given to this disclosure can only be determined by studying the following claims.

What is claimed is:

1. An apparatus, comprising:
a battery pack supported by at least one vehicle frame member;
a side frame member positioned adjacent to an edge of the battery pack;
a cross-member extending away from the side frame member and above the battery pack, the cross-member being spaced from the battery pack by a gap;
at least one bracket mounted to at least one of the side frame member and cross-member within the gap such that a portion of the at least one bracket is located between a lower surface of the cross-member and an upper surface of the battery pack such that in response to an impact load, the bracket prevents the cross-member from direct contact with the battery pack; and
wherein the bracket has a base portion that connects an upper leg to a lower leg, wherein the upper and lower legs are spaced apart from each other in an overlapping arrangement.

2. The apparatus of claim 1, wherein the side frame member comprises a rocker.

3. The apparatus of claim 1, wherein the cross-member comprises a seat cross-member.

4. The apparatus of claim 1, wherein the bracket is only mounted to the side frame member.

5. The apparatus of claim 1, wherein the bracket is mounted to the cross-member.

6. The apparatus of claim 1, wherein the bracket has an elliptical cross section, triangular cross-section, polygonal cross-section, or curved cross-section.

7. The apparatus of claim 1, wherein the battery pack is enclosed within a cover and, in response to the impact load, the bracket plastically deforms and absorbs energy to prevent the cross-member from direct contact with the cover.

8. The apparatus of claim 1, wherein the at least one bracket is positioned directly above the battery pack.

9. The apparatus of claim 1, wherein the portion of the at least one bracket has an upper bracket surface that directly faces the lower surface of the cross-member and a lower bracket surface that directly faces the upper surface of the battery pack.

10. An apparatus, comprising:
a battery pack supported by at least one vehicle frame member;
a side frame member positioned adjacent to an edge of the battery pack;
a cross-member extending away from the side frame member and above the battery pack, the cross-member being spaced from the battery pack by a gap; and
at least one bracket mounted to at least one of the side frame member and cross-member within the gap such that, in response to an impact load, the bracket prevents the cross-member from direct contact with the battery pack, and wherein the bracket has a base portion that connects an upper leg to a lower leg, wherein the upper and lower legs are spaced apart from each other and, wherein the upper leg is directly connected to an upper portion of the side frame member and the lower leg is directly connected to a lower portion of the side frame member, and wherein the base portion is free from contact with any structure when installed.

11. An apparatus, comprising:
a battery pack supported by at least one vehicle frame member and enclosed within a cover;
a rocker positioned adjacent to an edge of the battery pack;
a seat cross-member extending away from the rocker and above the battery pack, the seat cross-member spaced from the cover by a gap; and
a stopper bracket mounted to at least one of the rocker and the seat cross-member and extending into the gap above the battery pack such that in response to an impact load, the stopper bracket prevents the seat cross-member from direct contact with the cover, and wherein the stopper bracket has a base portion that connects an upper leg to a lower leg, wherein the upper and lower legs are spaced apart from each other in an overlapping arrangement.

12. The apparatus of claim 11, wherein the stopper bracket is only mounted to the rocker.

13. The apparatus of claim 11, wherein the stopper bracket has an elliptical cross section, triangular cross-section, polygonal cross-section, or curved cross-section.

14. The apparatus of claim 11, wherein the upper and lower legs are spaced apart from each other by an open internal area, or wherein the stopper bracket comprises a solid body.

15. The apparatus of claim 11, wherein the upper and lower legs are spaced apart from each other by an open internal area, and wherein a distal end of the upper leg includes a flange that is non-parallel with a distal end of the lower leg.

16. The apparatus of claim 15, wherein the rocker includes an inner surface facing the battery pack and a lower surface facing ground, and wherein the flange of the upper leg is directly connected to the inner surface and the distal end of the lower leg is directly connected to the lower surface.

17. The apparatus of claim 16, wherein the base portion is free from contact with any structure when installed, and, in response to the impact load, the stopper bracket plastically deforms and absorbs energy to prevent the seat cross-member from direct contact with the cover.

18. The apparatus of claim 17, wherein the base portion comprises a curved surface.

19. The apparatus of claim 17, wherein the base portion comprises a straight surface.

20. The apparatus of claim 11, wherein the stopper bracket is mounted to the rocker and the seat cross-member.

21. The apparatus of claim 11, wherein a portion of the stopper bracket is located between a lower surface of the seat cross-member and an upper surface of the battery pack.

22. A method comprising:
supporting a battery pack with at least one vehicle frame member;
positioning a rocker adjacent to an edge of the battery pack;
extending a seat cross-member away from the rocker and above the battery pack, the seat cross-member spaced from the battery pack by a gap; and
mounting a stopper bracket to at least one of the rocker and seat cross-member to extend into the gap above the battery pack such that in response to an impact load, the stopper bracket plastically deforms and prevents the seat cross-member from direct contact with the battery pack, and wherein the stopper bracket has a base portion that connects an upper leg to a lower leg, wherein the upper and lower legs are spaced apart from each other in an overlapping arrangement.

23. The method of claim 22, including positioning a portion of the stopper bracket between a lower surface of the seat cross-member and an upper surface of the battery pack.

* * * * *